United States Patent
Calabrese

[11] 4,302,095
[45] Nov. 24, 1981

[54] CLUTCH FOR ELECTROPHOTOCOPIER RECIPROCATING CARRIAGE

[75] Inventor: Richard A. Calabrese, Newtown, Conn.

[73] Assignee: Pitney-Bowes, Inc., Stamford, Conn.

[21] Appl. No.: 132,758

[22] Filed: Mar. 24, 1980

[51] Int. Cl.³ .................... G03G 15/28; G03G 15/32
[52] U.S. Cl. ........................................ 355/8; 355/3 R
[58] Field of Search ............................. 355/3 R, 8, 16

[56] References Cited
U.S. PATENT DOCUMENTS

| | | | |
|---|---|---|---|
| 3,850,520 | 11/1974 | Washio et al. | 355/8 X |
| 4,135,806 | 1/1979 | Abe et al. | 355/8 |
| 4,256,399 | 3/1981 | Ikeda | 355/8 |

*Primary Examiner*—Fred L. Braun
*Attorney, Agent, or Firm*—Lawrence E. Sklar; William D. Soltow, Jr.; Martin D. Wittstein

[57] ABSTRACT

Apparatus in an electrophotocopying machine having a reciprocating carriage moved by an endless drive member for reversing the direction of the carriage output drive member without reversing the direction of the endless drive member. The apparatus includes a shaft fixedly mounted to the housing for the electrophotocopying machine, the shaft having a flange extending radially outwardly from a central portion thereof, an input drive member rotatably mounted at one end of the shaft and axially slidable along the shaft, the input drive member having apparatus for drivingly engaging the endless drive member, and an output drive member rotatably mounted at the other end of the shaft, the output member having apparatus for frictionally engaging the input drive member and apparatus for driving the reciprocating carriage. The apparatus also includes a plurality of rollers mounted in the flange of the shaft, the bearings being engageable with the input drive member and the output drive member, biasing apparatus for maintaining frictional engagement between the input drive member and the output drive member, and apparatus for sliding the input drive member out of frictional engagement with the output drive member and into frictional engagement with the plurality of rollers, whereby when the input drive member is rotated by the endless drive member and frictionally engages the output drive member, the output drive member is caused to rotate in the same direction as the input drive member, and when the input drive member is rotated by the endless drive member and frictionally engages the rollers, the output drive member is caused to rotate in the opposite direction of the input drive member.

7 Claims, 4 Drawing Figures

CLUTCH FOR ELECTROPHOTOCOPIER RECIPROCATING CARRIAGE

BACKGROUND OF THE INVENTION

The instant invention relates to an electrophotocopying machine having a reciprocating carriage moved by an endless drive member, and more particularly to a clutching device for reversing the direction of the carriage output drive member without reversing the direction of the endless drive member.

Many electrophotocopying machines employ a reciprocating carriage to scan expose a document to be copied across an illuminating station that comprises an exposure slit located on the top of the cabinet housing, underneath the reciprocating carriage. During a copy cycle, the carriage moves in a given direction a predetermined distance that is usually long enough to enable the copier to make copies of fourteen inch long documents. Once the carriage has travelled the predetermined distance and the original document has been completely scanned, the carriage reverses its direction in order to return to its original starting or home position. Typically, an endless chain is powered by a motor and drives the carriage through its cycle, but complex and expensive multiple gearing and clutching mechanisms are required in order to reverse the direction of the carriage output drive member without reversing the direction of the chain input.

SUMMARY OF THE INVENTION

Accordingly, the instant invention provides a less complex apparatus in an electrophotocopying machine having a reciprocating carriage moved by an endless drive member for reversing the direction of the carriage output drive member without reversing the direction of the endless drive member. The apparatus comprises a shaft fixedly mounted to the housing for said electrophotocopying machine, said shaft having a flange extending radially outwardly from a central portion thereof, an input drive member rotatably mounted at one end of said shaft and axially slidable along said shaft, said input drive member having means for drivingly engaging said endless drive member, and an output drive member rotatably mounted at the other end of said shaft, said output member having means for frictionally engaging said input drive member and means for driving said reciprocating carriage. The apparatus also comprises a plurality of rollers mounted in the flange of said shaft, the bearings being engagable with said input drive member and said output drive member, biasing means for maintaining frictional engagement between said input drive member and said output drive member, and means for sliding said input drive member out of frictional engagement with said output drive member and into frictional engagement with said plurality of rollers, whereby when said input drive member is rotated by said endless drive member and frictionally engages said output drive member, said output drive member is caused to rotate in the same direction as said input drive member, and when said input drive member is rotated by said endless drive member and frictionally engages said rollers, said output drive member is caused to rotate in the opposite direction of said input drive member.

DETAILED DESCRIPTION

Figure 1:
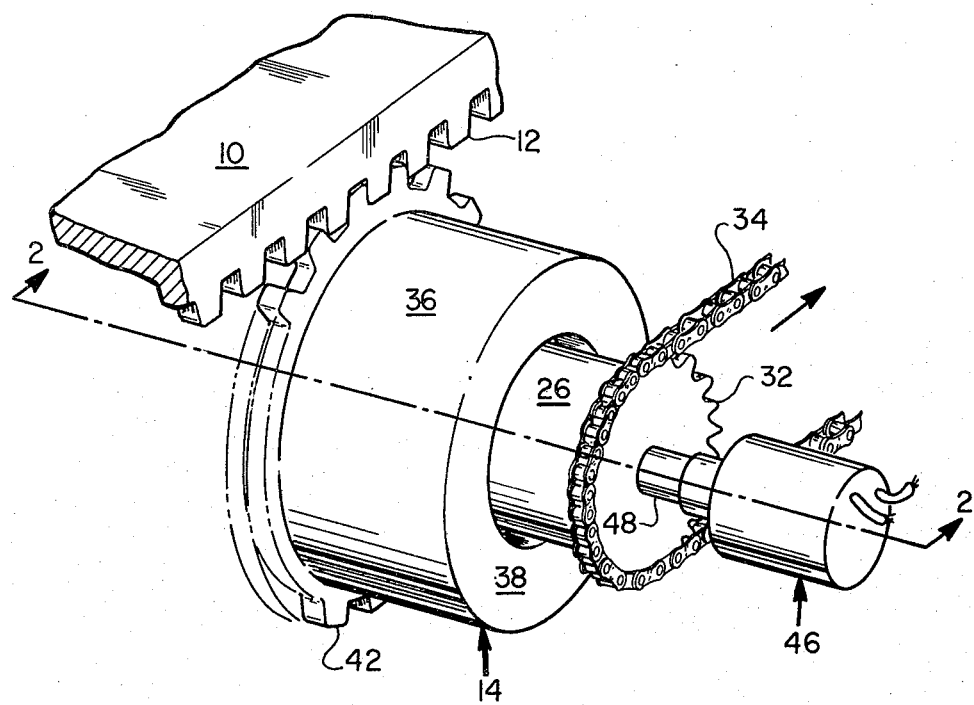
FIG. 1 is a perspective view of a reciprocating electrophotocopier carriage and clutching apparatus in accordance with the instant invention for driving said reciprocating carriage.

In describing the preferred embodiment of the instant invention, reference is made to the drawings, wherein there is seen a portion of a reciprocating carriage 10 of an electrophotocopying machine (not shown) which is used to support an original document (not shown) to be copied. The bottom of the carriage 10 includes a spur rack 12 which is drivingly engaged with the clutch generally designated 14 is a manner to be described in further detail hereinafter.

The clutch 14 includes a shaft 16 fixedly mounted in a thrust bearing bushing 18 secured to a housing member 20 for the electrophotocopying machine (not shown). The shaft 16 includes a flange 22 extending radially outwardly. Four rollers 24a–d, preferably formed from a plastic or a rubber, are mounted in the flange 22 and are spaced equidistantly from each other and rotate about axes perpendicular to the axis of the shaft 16. The axes of rollers 24a and 24c are parallel to each other, which axes in turn are perpendicular to the axes of rollers 24b and 24d, which are parallel to each other. Other types of rotational members, such as cones, roller bearings, or ball bearings, may also be used. Obviously, more or less than four rollers may be used depending on the desired operational characteristics.

The clutch 14 further includes an input drive member 26 rotatably mounted on the right side of the shaft 16. The input drive member 26 is axially slidable along the shaft 16 between two limits as described in further detail hereinbelow. At the left end of the input drive member 26 is a flange 28 having an exterior surface 30 to be discussed further hereinbelow. At its right end the input drive member 26 includes a sprocket 32 for engagement with a drive chain 34 (see FIG. 1) which is powered by a motor and which may drive other copier components in addition to the reciprocating carriage 10.

Another component of the clutch 14 is an output drive member 36 which is rotatably mounted on the left side of the shaft 16. The output drive member 36 at one end includes a flange 38 having an interior surface 40 (see FIG. 3) for frictionally engaging the exterior surface 30 of the input drive member flange 28. At its other end the output drive member 36 includes a spur gear 42 for driving engagement with the spur rack 12 on the reciprocating carriage 10.

A compression spring 44 surrounds the shaft between the input drive member 26 and the shaft flange 22 for urging the exterior surface 30 of the flange 28 against the interior surface 40 of the flange 38 to thereby maintain frictional engagement between the input drive member 26 and the output drive member 36.

Associated with the clutch 14 is a solenoid 46 having an arm 48 for overcoming the bias of the compression spring 44 and sliding the input drive member 26 out of frictional engagement with the output drive member 36 and into frictional engagement with the roller bearings 24. Other actuation means, such as levers or cams, may be used instead of a solenoid.

Figure 2:
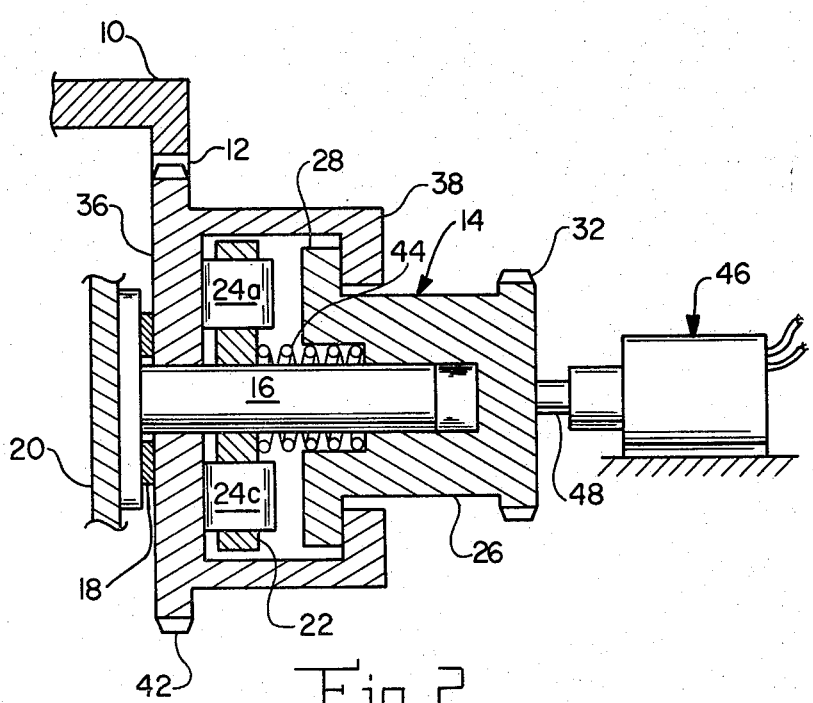
FIG. 2 is a sectional view taken on the vertical plane indicated by the line 2—2 in FIG. 1, showing the input drive member of the clutching apparatus biased against the output drive member of the clutching apparatus.

In the normal or printing mode, the input drive member 26 and the output drive member 36 are frictionally engaged as shown in FIG. 2. When the drive chain 34 imparts a clockwise rotation (as shown by the arrow in FIG. 1) to the input drive member 26 when viewed from the right, the output drive member 36 is also caused to rotate clockwise.

Figure 3:
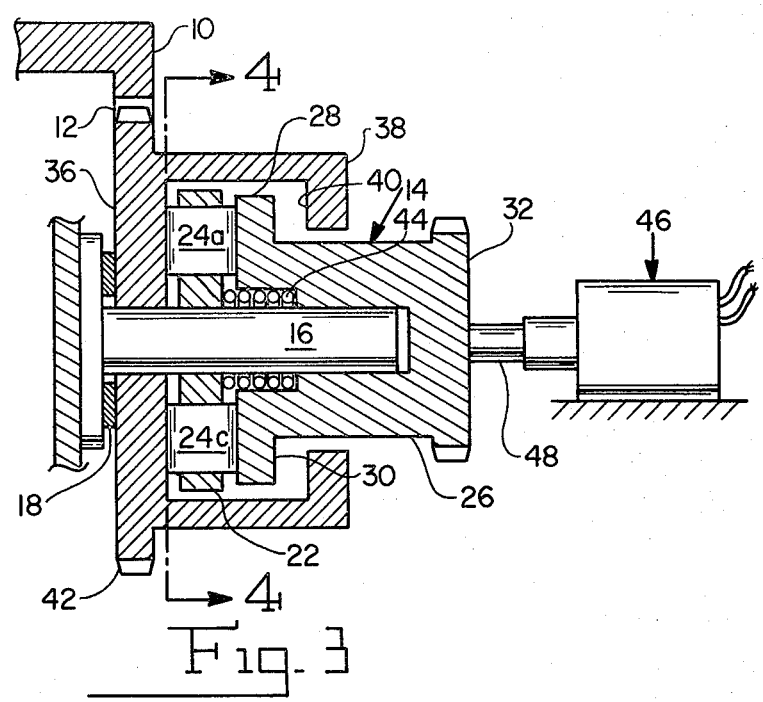
FIG. 3 is similar to FIG. 2 but shows the input drive member of the clutching apparatus not biased against the output drive member but frictionally engaging the roller bearings in the clutching apparatus.
Figure 4:
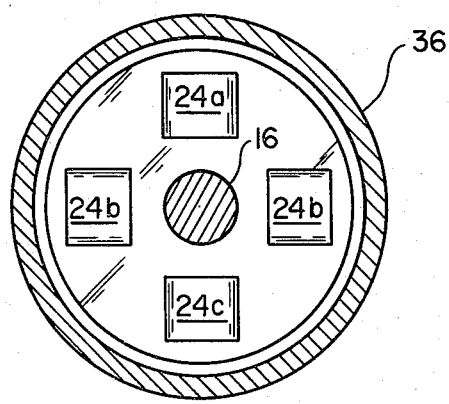
FIG. 4 is a sectional view taken on the vertical plane indicated by the line 4—4 in FIG. 3.

When the solenoid 46 is energized, the solenoid arm 48 moves to the left causing the input drive member 26 to translate to the left on the shaft 16. The total amount of translational movement of the member 26 is typically between about 0.020 and 0.030 inch so that there is no effect on the drive chain 34. A gap is thereby formed between the surfaces 30 and 40 and the input drive member 26 frictionally engages the roller bearings 24a-d which in turn engage the output drive member 36. The compression spring 44 becomes further compressed. This mode, seen in FIG. 3, is now the reversal or carriage return mode. As the input drive member 26 continues to rotate clockwise when viewed from the right, the rollers 24a-d are caused to rotate about their axes. This rotation of the rollers 24a-d is perpendicular to the rotational axes of the drive members 26 and 36 and imparts a couterclockwise rotation to the output drive member 36, thereby reversing the output motion of the output drive member 36 without changing the input motion of the input drive member 26.

By adjusting the pressure of the compression spring 44 and the holding force of the solenoid 46, various slip torque values can be obtained for operator and machine safety.

The overall movement of the reciprocating carriage 10 is conventional and well understood. The carriage 10 starts from a rest position against a home stop and a first limit switch. When the operator depresses the print button, the carraige 10 moves through its scanning or printing mode (the solenoid 46 is de-energized) until it hits a second stop and actuates a second limit switch, thereby energizing the solenoid 46 and reversing the direction of the carriage 10 until the carriage 10 hits the home stop and first limit switch to thereby shut off the copier.

Other variations in applications and in the described mechanism will occur to those skilled in the art, and may be employed without departing from the spirit or scope of this invention.

What is claimed is:

1. Apparatus in an electrophotocopying machine having a reciprocating carriage moved by an endless drive member for reversing the direction of the carriage output drive member without reversing the direction of the endless drive member, comprising:

a shaft fixedly mounted to the housing for said electrophotocopying machine, said shaft having a flange entending radially outwardly from a central portion thereof;

an input drive member rotatably mounted at one end of said shaft and axially slidable along said shaft, said input drive member having means for drivingly engaging said endless drive member;

an output drive member rotatably mounted at the other end of said shaft, said output member having means for frictionally engaging said input drive member and means for driving said reciprocating carriage;

a plurality of rollers mounted in said flange of said shaft, said rollers being engageable with said input drive member and said output drive member;

biasing means for maintaining frictional engagement between said input drive member and said output drive member; and means for sliding said input drive member out of frictional engagement with said output drive member and into frictional engagement with said plurality of rollers, whereby when said input drive member is rotated by said endless drive member and frictionally engages said output drive member, said output drive member is caused to rotate in the same direction as said input drive member, and when said input drive member is rotated by said endless drive member and frictionally engages said rollers, said output drive member is caused to rotate in the opposite direction of said input drive member.

2. The apparatus of claim 1, wherein said rollers are formed from a rubber.

3. The apparatus of claim 1, wherein the biasing means comprises a compression spring surrounding said shaft between the input drive member and the shaft flange.

4. The apparatus of claim 3, wherein said sliding means comprises a solenoid.

5. The apparatus of claim 4, wherein said plurality of rollers comprises four rollers equidistantly spaced from each other.

6. The apparatus of claim 5, wherein the axes of said rollers are all perpendicular to the axis of the shaft.

7. The apparatus of claim 6, wherein said input drive member is axially slidable between about 0.020 and 0.030 inch.

* * * * *